United States Patent [19]

Johnson et al.

[11] Patent Number: 4,848,028
[45] Date of Patent: Jul. 18, 1989

[54] INJECTION TOOL FOR TREATING TREES

[75] Inventors: Robert E. Johnson, West Vancouver; William R. Dinsmore, Burnaby; Christopher I. Hunt, Vancouver, all of Canada

[73] Assignee: Powertech Labs Inc., Surrey, Canada

[21] Appl. No.: 178,677

[22] Filed: Apr. 7, 1988

[51] Int. Cl.$^4$ .............................................. A01G 29/00
[52] U.S. Cl. .................................................... 47/57.5
[58] Field of Search .................. 47/57.5; 29/255, 275; 81/55, 57.5, 124.1, 124.3, 124.6

[56] References Cited

U.S. PATENT DOCUMENTS

| | | | |
|---|---|---|---|
| 1,677,473 | 7/1928 | Gast | 81/55 |
| 2,796,701 | 6/1957 | Mauget | 47/57.5 |
| 3,290,822 | 12/1966 | Mauget | 47/57.5 |

FOREIGN PATENT DOCUMENTS

| | | | |
|---|---|---|---|
| 0111254 | 6/1984 | European Pat. Off. | 47/57.5 |
| 3008142 | 10/1981 | Fed. Rep. of Germany | 81/144 |

Primary Examiner—Robert A. Hafer
Assistant Examiner—Charles H. Sam
Attorney, Agent, or Firm—Townsend and Townsend

[57] ABSTRACT

An apparatus for fastening an injection capsule having a fastening screw to a tree or woody plant comprising a rotatable shaft supported in a bearing member. The rotatable shaft extends through the bearing member into a cavity for holding and aligning an injection capsule where the shaft is formed into a driving member. The shaft is connected to a power source to rotate the shaft, whereby the driving member engages the fastening screw of the capsule and, upon rotation of the rotatable shaft, the fastening screw is rotatably driven into the tree or woody plant to fasten the injection capsule thereto.

4 Claims, 2 Drawing Sheets

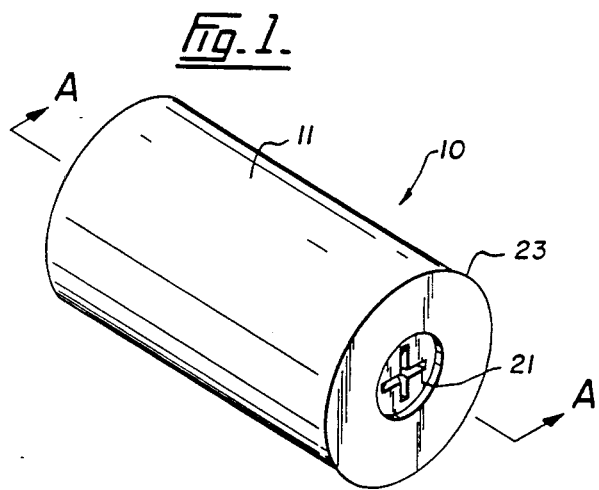
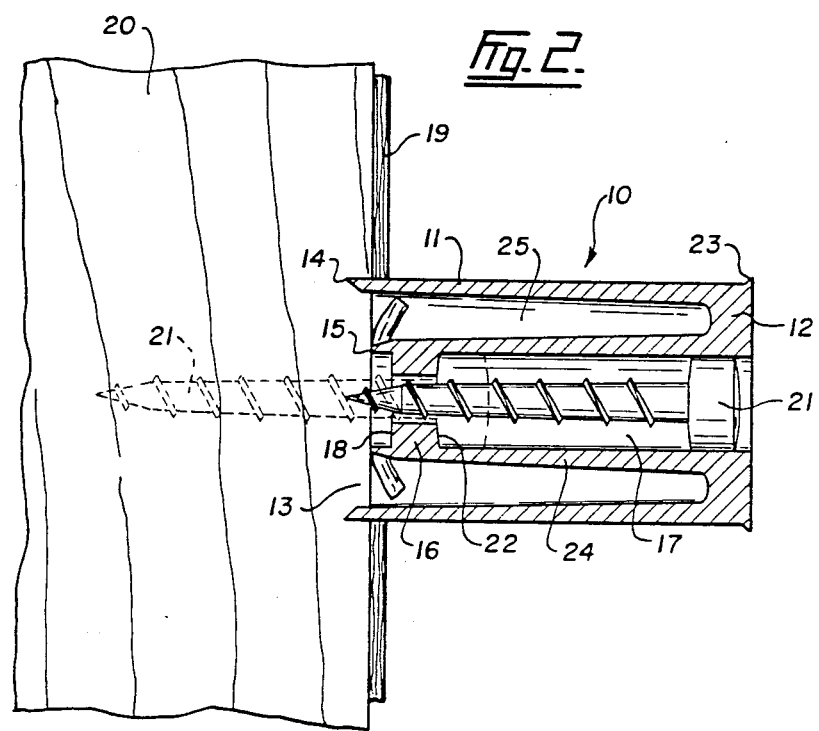

INJECTION TOOL FOR TREATING TREES

This invention relates to an injection tool for administering chemical substances to trees and woody plants.

DESCRIPTION OF THE PRIOR ART

Excessive vertical growth of trees on utility rights-of-way can damage electrical transmission systems and cause danger to life, consequently, such growth must be controlled. This can be accomplished by selectively injecting herbicides or growth-retarding chemicals into tall-growing trees to encourage the development of a stable community of low-growing plants that will not interfere with the overhead transmission lines.

There is a large body of prior art detailing methods and devices for administering chemicals to trees:

U.S. Pat. No. 3,691,683 to Sterzik teaches a blunt hammer-axe to drive an injection cartridge into the tree, causing the end cap of the cartridge to rupture upon impact, thereby releasing the herbicide contained within. Leakage can occur with this device if the operator does not successfully place the device with his first blow.

U.S. Pat. No. 4,110,933 to Haggblom teaches a process for killing trees or woody plants that uses a pistol having a magazine, loading spring and a number of biocide wedges. Chemicals contained in a recess of the wedges are absorbed by the tree. Again, there is a risk of leakage of the chemical from the tree.

U.S. Pat. No. 3,074,207 to Laing discloses a device for treating trees that employs a nail, screw, pin or the like, coated with a water-soluble glue containing ocean salt and certain trace elements. The device is driven into a tree. The requirement for a hard coating limits the chemicals which can be used and there is a risk of leakage of the chemical both before and after installation.

U.S. Pat. No. 3,461,588 to Johnson discloses an explosively-operated injection gun for treating trees that forces a needle into the bark of a tree by firing a cartridge and then forces a measured supply of herbicide from a supply reservoir through the needle. Leakage of the chemicals is possible.

A different injection tool is disclosed by Bakhtina in Russian Pat. No. 496,027. The chemical, contained in a pressurized chamber, is forced into the tree through a knife-type needle. The chemical is administered by striking the tool. Precautions are included in the tool to prevent the escape of toxic vapour which may build up from repeated impact cycles and be a danger to the operator. This method does not employ capsules and may leak chemicals from the injection hole after the tool is removed.

U.S. Pat. No. 1,080,960 to Kleckner teaches a device consisting of a cap which contains a number of capsules. These are held against a section of a tree, which has had its bark removed. Spurs hold the device in position until staples can be driven home. The disadvantages of this method are that it is necessary to remove a portion of bark prior to use and leakage is possible.

U.S. Pat. No. 3,706,161 to Jenson discloses a tree medication capsule that dispenses medication into the tree when forced into a pre-drilled hole. Barbs prevent the capsule from being removed. Pre-drilling of the tree is required and leakage is possible.

U.S. Pat. No. 3,968,594 to Kawakami discloses a method and apparatus for the chemical treatment of trees comprising a self-tapping applicator head having a centrally-defined passageway in its shank, a number of output orifices at its tip and an internally-threaded hole. In use, a hole is first drilled in the tree, the applicator is inserted and the chemicals passed into the tree under pressure through a hose line secured to the internal threaded hole. The common problem of chemical leakage is again present.

Canadian Pat. No. 1,191,396 to Dillistone discloses an open-ended capsule partially filled with a solid or semi-solid soluble substance which is driven into the tree by manual force using an elongated lance. The open end of the capsule must penetrate the bark under the axial force of the lance and it must remain in place without allowing the chemical substance to leak. A disadvantage is seen in relatively young trees, where only a small force would be required to dislodge such capsules, posing a leakage hazard.

British Pat. No. 786,083 to Caughey teaches a cup-shaped receptacle and a fastener member for attaching the receptacle to the tree. The cup may be of any shape, open at one end and the fastener may be a nail or screw or the like. The patent granted to Caughey does not disclose a tool for rapidly installing the capsules described.

The most common problem with the prior art methods and devices for administering chemicals to trees is the fact that leakage of the chemical agent can occur after the tree has been treated. As well, many of the methods for applying the chemical are slow and awkward and not suited to large scale treatment of trees.

Copending application Ser. No. 178,094 entitled "Injection Capsule for Treating Trees" discloses an improved injection capsule for attachment to a tree.

The injection capsule comprises a receptacle portion to hold a chemical to treat trees and woody plants, the receptacle portion having a closed end and an open end. The closed end is formed with a stem having an internal bore extending through the receptacle portion from the closed end to the open end and housing fastening means, movable along the length of the bore and guided by the walls of the bore. The fastening means allow the injection capsule to be attached to a tree or woody plant. The bore is formed with a narrowed diameter section to limit the travel of the fastening means as the fastening means is pushed through the internal bore and driven into a tree or woody plant in order to hold the open end of the injection capsule tightly against the tree or woody plant.

The injection capsule of the copending application firmly attaches to the tree and thereby minimizes the leakage problems associated with the prior art.

SUMMARY OF THE INVENTION

The invention of the present application comprises an injection tool suitable for use with injection capsules having fastening means, and preferably for use with injection capsule of the above mentioned copending application. The injection tool of the present application comprises a rotatable shaft supported in a bearing member, said rotatable shaft extending through said bearing member into a cavity for holding and aligning an injection capsule where said shaft is formed into a driving member, said shaft being connected to means to rotate the shaft whereby the driving member engages the fastening means of said capsule and, upon rotation of said rotatable shaft, said fastening means is rotatably driven into said tree or woody plant to fasten the injection capsule thereto. The injection tool allows for rapid, reliable and easy installation of the injection capsules to trees and is suitable for large scale treatment of trees.

DESCRIPTION OF THE DRAWINGS

The devices of the present invention are illustrated in the following figures in which:

FIG. 1 shows an injection capsule for use with the injection tool of the present invention;

FIG. 2 is a sectioned view of the injection capsule taken along line A—A of FIG. 1 showing the method of attachment of the injection capsule to the trunk of a tree;

Referring to FIGS. 1 and 2, there is shown an injection capsule according to copending application Ser. No. 178,094 entitled "Injection Capsule for Treating Trees". Injection capsule 10 comprises a main body 11 which houses a gelled chemical in cavity 25 between the outer wall of said main body and an internal stem 24, the main body having a closed end 12 and an open end 13. The outer shape of the capsule 10 is generally cylindrical, however, the capsule has flared lip 23 about the periphery of closed end 12. Capsule 10 is formed with an internal boss 16 at the end of a bore 17 which extends through stem 24 as the stem extends inwardly from the closed end 12 along the axis of the main body 11. Prior to installation on the tree, metal screw fastener 21 is completely contained in the bore 17 of the capsule and remains in the position illustrated, using solid lines, in FIG. 2 through friction with the boss 16. Complete enclosure of the screw is an important feature of the present invention, allowing for easy handling of the capsule by automated machinery during the process of filling the capsule with gelled chemical. It also allows for easier packaging of the filled capsules for transport, prior to installation.

Figure 3:
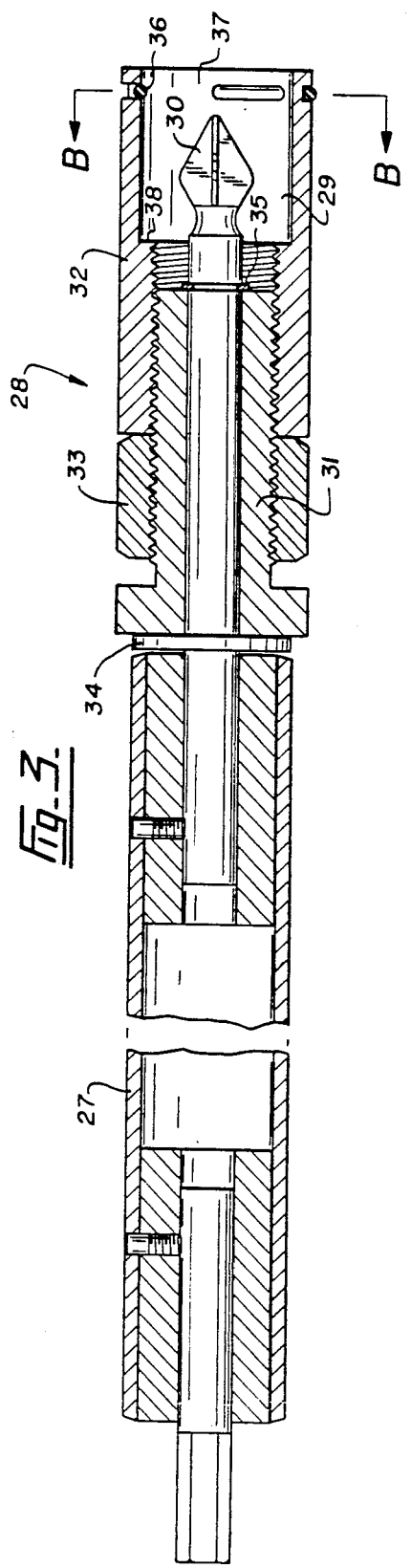
FIG. 3 is a sectioned view of the injection tool of the present application used to apply the injection capsule to a tree.

When the capsule is installed on the tree, contact is initially made between the edge 14 of the capsule and the bark 19. The screw fastener 21 is rotated and because of the restraint against rotation provided by the contact between the edge 14 of the capsule and the bark 19, the screw fastener advances through boss 16 until its head comes to a stop against the mating surface 22 of the boss 16. This position is shown by the dash lines in FIG. 2.

The open end 13 of the capsule is tapered or sharpened at the outside edge 14 and at the edge of annular extension 15 to the boss 16. The relative positions of sharpened edges 14 and 15 are such that, as the screw fastener 21 advances, sharpened edge 14 cuts through the bark of the tree and penetrates into the tissues beneath the bark, and sharpened edge 15 also cuts through the bark and penetrates into the tissues beneath until the outer surface of the bark contacts surface 18 of the boss 16. By this means an annular section of bark is separated from the main body of the tree bark 19. This annular section tends to curl slightly as illustrated schematically in FIG. 2 and exposes an area of conductive tissue beneath the bark to the gelled chemical contained within the cavity 25 of the capsule 11 so that the natural fluids within the conductive tissue dissolve and transport the chemical throughout the tree.

The elasticity of the material in capsule 10 stores elastic energy, derived from the insertion of screw fastener 21 into the tree, to hold the capsule tightly to the tree and provide sealing pressure to prevent leakage at the sharpened edge 14. Leakage of the chemical around the screw fastener is prevented by the compression of boss 16 which applies pressure to sharpened edge 15 and provides a sealing surface between the screw head and the boss at the mating surface 22.

It is desirable that screw fastener 21 have a sharp pointed tip and sharp threads of relatively steep pitch. This minimizes the amount of energy required for insertion into green wood. A Philips-type screw head is advantageous, allowing for easy engagement with a powered screwdriver bit, and slippage when the screw fastener is driven to its correct depth, thereby ensuring that the sharpened edges of the capsule cut the bark sufficiently for a variety of bark thicknesses.

The injection tool of the present application is shown in FIG. 3 and is used to attach the previously described injection capsules to a tree. Individual capsules may be inserted into the attachment apparatus with one hand while the other hand holds the manual or powered drill used to power the injection tool.

Figure 4:
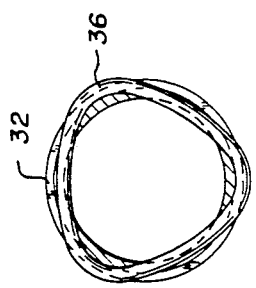
FIG. 4 is a detailed section view taken along line B—B of FIG. 3.

Referring to FIG. 3, the injection tool 28 comprises a long screwdriver bit 30 mounted within an externally threaded bushing 31. A correspondingly threaded cylindrical sleeve 32 is rotatably mounted about threaded bushing 31 with locknut 33 to allow for adjustment of the sleeve. The bushing 31 is bored to a diameter which allows for a free running fit with the shaft of the screwdriver bit 30. Materials for the screwdriver bit 30 and the bushing 31 are selected to minimize friction at the bearing surfaces. The bushing is held in place between a flange 34 and a circlip 35. The walls of sleeve 32 define a cavity 29 extending from opening 37 to internal shoulder 38 for holding an injection capsule 10. As shown in FIG. 4, the forward end of the sleeve 32 adjacent opening 37 is circumferentially grooved, including, in this embodiment, three slots, to accommodate a tight fitting rubber O-ring 36 which protrudes through the wall thickness of the sleeve at the three slots. The sleeve 32 and inwardly protruding segments of resilient O-ring 36 are sized to allow capsule 10 to be easily inserted into cavity 29 yet hold the capsule by friction to prevent it from falling out prior to installation on a tree. Slight flaring 23 of the capsule at the closed end 12 assists in retaining the capsule in cavity 29. Injection tool 28 is mounted to a manual or powered drill in a conventional manner using the shaft of screwdriver bit 30. It will be understood that the powered drill can use electric, hydraulic or other suitable power sources. As shown in FIG. 3, an extension member 27 can be used to increase the reach of the operator when installing capsules to trunks of trees with closely spaced branches.

Injection tool 28 is used in the following manner. The operator inserts an injection capsule 10 part way into cavity 29 through opening 37. Cylindrical sleeve 32, containing capsule 10 in cavity 29 is then directed towards a tree bringing edge 14 of the capsule in contact with the bark 19 of the tree 20. Bit 30 is pushed against capsule 10 and enters the open end of bore 17 to engage the head of screw fastener 21. Necessarily, bit 30 must be shaped to correspond to the head of screw fastener 21. Drill bit 30 is rotated either by a manual or powered drill to cause screw fastener 21 to advance and enter the tree.

As the bit 30 and the screw fastener 21 advance the cylindrical sleeve 32 advances over the capsule 10 causing the capsule 10 to travel further into the cavity 29 until the closed end 12 contacts the internal shoulder 38 of the sleeve 32. At the same time as the closed end 32 contacts the shoulder 38 the head of the screw fastener 21 contacts the mating surface 22 of the boss 16 which causes pressure to be exerted on edge 14 of the capsule 10, causing said edge to cut through the bark and penetrate to the tissues of the tree beneath. The free running bearing between the bushing 31 and the shaft 30 ensures that the capsule does not rotate as the edge 14 penetrates the bark. Since there may be slight deformation of the edge 14 after said edge begins to cut the bark and tissues beneath the bark it has been found desirable that the capsule not rotate, resulting in a superior seal against leakage at the edge 14.

As the surface 18 of boss 16 contacts the bark the torque required to further advance the screw fastener 21 increases rapidly. Since the distance between the internal shoulder 38 and the tip of screwdriver bit 30 establishes how far bit 30 can enter bore 17, said distance also determines the depth to which the screwdriver bit enters its mating slots in the head of the screw fastener 21 after the head of said screw fastener contacts the surface 22. Said depth limits the maximum torque which can be applied to the screw fastener 21. When the head of the screw fastener 21 advances beyond the point where screwdriver bit 30, by virtue of its limited distance of travel, is no longer in fully mated contact with the screw fastener slots, a point is soon reached where contact friction between the screwdriver bit 30 and the mated slots of screw fastener 21 is not sufficient to overcome the torque required to further advance said screw fastener. The screw fastener 21 then ceases to rotate and the screwdriver bit 30 slips out of the slots in the head of the screw fastener 21 and continues to rotate.

The maximum torque that can be transmitted to the screw fastener 21 varies, in part, with the distance between the internal shoulder 38 and the tip of the screwdriver bit 30, and the axial force the operator exerts on the capsule via the shoulder 38 through the injection tool 28, in the direction of the tree. Since this axial force may be substantially different for different operators, to ensure correct installation of capsules, it has been found that the capability of adjusting the axial position of the sleeve 32 on the threaded bushing 31, which is done by releasing locknut 33 and rotating the threaded sleeve 32 relative to the threaded bushing 31, is important in order to ensure that the capsules are inserted to the correct depth in the tree so that the gelled chemical can enter the circulatory system of the tree. In addition, small adjustments may also be made to accommodate trees of different bark thicknesses.

With correct adjustment of the position of the sleeve 32 on the bushing 31 the capsule installation process requires only a small axial force on the part of the operator. This is particularly desirable when treating trees of small diameter, when even a small force will cause them to bend away from the operator. Minimal force is required to pierce the bark with the sharp tip of the screw fastener 21. After the screw thread has started to enter the tree only very light force is required to ensure correct seating of the capsule. An additional advantage of the small axial force required is that it reduces operator fatigue.

The injection tool of the present invention allows trees to be quickly and efficiently treated and minimizes the exposure of potentially harmful chemicals to the environment. The injection capsule and injection tool in combination confine the exposure of herbicidal chemicals to the tree or woody plant being treated and ensure that there is minimal risk of exposure to the operator.

The present invention provides an injection tool for rapid, secure and safe installation of injection capsules to individual trees.

We claim:

1. An apparatus able to fasten an injection capsule having a fastening means to a tree or woody plant comprising:

a rotatable shaft supported in a bearing member that is externally threaded; a correspondingly threaded sleeve that is threadedly mounted about said bearing member, said threaded sleeve extending past the end of the bearing member to define a cavity able to hold and align an injection capsule, said rotatable shaft extending through said bearing member into said cavity where said shaft is formed into a driving member, said shaft being connected to means to rotate the shaft, whereby the driving member is adapted for engagement with the fastening means of said capsule and is able to rotatably drive said fastening means into said tree or woody plant to fasten the injection capsule thereto, the position of said threaded sleeve about said bushing being adjustable by rotating said sleeve to telescope said sleeve over said bushing member in order to vary the extension of said driving member into said holding and aligning cavity thereby allowing the user to control the depth to which a fastening means is driven into a tree or woody plant.

2. An apparatus as claimed in claim 1 in which said threaded sleeve is prevented from moving about said threaded bushing once said sleeve has been positioned by a locknut threadably mounted about said threaded bushing.

3. An apparatus as claimed in claim 1 in which said threaded sleeve for defining a cavity for holding and aligning an injection capsule is circumferentially grooved to accommodate a rubber O-ring which protrudes into the interior of said cavity at a number of slots, the inwardly protruding O-ring segments being sized to allow the injection capsule to be inserted into the cavity, said O-ring segments thereafter engaging the flared end of said injection capsules to releasably hold said capsules within the cavity.

4. An apparatus as claimed in claim 1 in which said driving member is a screwdriver bit to engage a suitably formed head in said fastening member of said injection capsule.

* * * * *